T US008823767B2

(12) United States Patent
Varga et al.

(10) Patent No.: US 8,823,767 B2
(45) Date of Patent: Sep. 2, 2014

(54) DELIVERY OF SHORT MESSAGES (75) Inventors: Jozsef Varga, Nagydobsza (HU); Ulrich Wiehe, Bad Hersfeld (DE)

(73) Assignee: Nokia Siemens Networks OY, Espoo (FI)

( * ) Notice: Subject to any disclaimer, the term of this patent is extended or adjusted under 35 U.S.C. 154(b) by 559 days.

(21) Appl. No.: 13/106,396

(22) Filed: May 12, 2011

(65) Prior Publication Data
US 2011/0280383 A1 Nov. 17, 2011

Related U.S. Application Data (63) Continuation of application No. PCT/EP2010/056559, filed on May 12, 2010.

(51) Int. Cl.
*H04M 11/04* (2006.01)
*H04L 12/66* (2006.01)

(52) U.S. Cl.
USPC .......... 348/14.08; 368/21; 370/236; 370/338; 379/93.01; 455/419; 455/426.1; 455/456.1; 455/466; 455/556.1; 707/694; 709/206; 709/225; 709/231

(58) Field of Classification Search
CPC .... H04W 4/22; H04W 76/007; G06F 13/426; H04L 29/12009
USPC ....................... 348/14.08; 368/21; 379/93.01; 455/456.1, 466, 54.1, 419, 426.1, 461, 455/556.1; 709/231, 206, 225; 370/236, 370/338; 707/694
See application file for complete search history.

(56) References Cited

U.S. PATENT DOCUMENTS

| | | | | |
|---|---|---|---|---|
| 4,860,292 A * | 8/1989 | Newman et al. | ............... | 714/748 |
| 5,440,559 A * | 8/1995 | Gaskill | ......................... | 370/314 |
| 5,678,196 A * | 10/1997 | Doyle | ........................... | 455/466 |
| 5,742,905 A * | 4/1998 | Pepe et al. | ..................... | 455/461 |
| 6,108,534 A * | 8/2000 | Bourgeois et al. | ............ | 455/419 |
| 6,175,859 B1 * | 1/2001 | Mohler | ......................... | 709/206 |
| 6,230,205 B1 * | 5/2001 | Garrity et al. | ................. | 709/231 |
| 6,738,635 B1 * | 5/2004 | Lewis et al. | ................... | 455/466 |
| 6,947,738 B2 * | 9/2005 | Skog et al. | ................. | 455/426.1 |
| 7,675,538 B2 * | 3/2010 | Schrader et al. | ........... | 348/14.08 |
| 7,751,851 B2 * | 7/2010 | Lee et al. | .................... | 455/556.1 |

(Continued)

FOREIGN PATENT DOCUMENTS

WO 03019884 A1 3/2003

OTHER PUBLICATIONS

3GPP TSG CT4 Meeting #48, San Francisco, US Feb. 22-26, 2010, 3GPP DRAFT; vol. CT WG4, no. San Francisco, US; 201200222, Mar. 2, 2010, C4-100618, Prevention of Timeout in IP-SM-GW, XP050411235.

(Continued)

*Primary Examiner* — Gerald Gauthier
(74) *Attorney, Agent, or Firm* — Laurence A. Greenberg; Werner H. Stemer; Ralph E. Locher (57) ABSTRACT

Methods, apparatuses, system and a computer program product provide improved delivery of short messages. The method includes the steps of receiving a message to be delivered to user equipment, negotiating a timer value with a short message service routing element, forwarding the short message to the short message service routing element together with the negotiated timer value and starting a timer according to the negotiated timer value.

31 Claims, 5 Drawing Sheets

(56) References Cited

U.S. PATENT DOCUMENTS

| | | | | |
|---|---|---|---|---|
| 7,821,875 | B2* | 10/2010 | Punkka | 368/21 |
| 7,958,099 | B2* | 6/2011 | Kang et al. | 707/694 |
| 8,254,971 | B1* | 8/2012 | Mikan et al. | 455/466 |
| 8,671,214 | B2* | 3/2014 | Lockhart et al. | 709/231 |
| 2004/0248587 | A1* | 12/2004 | Niemenmaa | 455/456.1 |
| 2005/0213505 | A1* | 9/2005 | Iochi et al. | 370/236 |
| 2006/0058048 | A1* | 3/2006 | Kapoor et al. | 455/466 |
| 2006/0268801 | A1* | 11/2006 | Morita | 370/338 |
| 2006/0271680 | A1* | 11/2006 | Shalev et al. | 709/225 |
| 2007/0191035 | A1* | 8/2007 | Huggett | 455/466 |
| 2008/0233979 | A1* | 9/2008 | Li | 455/466 |
| 2011/0280383 | A1* | 11/2011 | Varga et al. | 379/93.01 |

OTHER PUBLICATIONS

3GPP TSG CT4 Meeting #50, Xi'an, P.R. China, Aug. 23-27, 2010, 3GPP DRAFT; CR 29002-920 SMS Tiimeout Prevention Final V2, vol. CT WG4, no. Xian; 20100823, Aug. 13, 2010, XP050447182, C4-101993, Prevention of Timeout in IP-SM-GW, retrieved on Aug. 13, 2010.

3GPP TS 29.002 V9.1.0, 3GPP; Technical Specification Group Core Network and Terminals; Mobile Application Part (MAP) specification (Release 9), No dates.

"3rd Generation Partnership Project; Technical Specification Group Core Network Terminals; Mobile Application Part (MAP) specification (Release 9)" 3GPP TS 29.002 V9.1.0, Mar. 2010, pp. 1-934.

"Prevention of Timeout in IP-SM-GW", 3GPP TSG CT4 Meeting # 49, Discussion, May 10-14, 2010, pp. 1-5, Kyoto, Japan.

"3rd Generation Partnership Project; Technical Specification Group Services and System Aspects; Circuit Switched (CS) fallback in Evolved Packet System (EPS); Stage 2 (Release 9)" 3GPP TS 23.272 V9.3.0, Mar. 2010, pp. 1-66.

3rd Generation Partnership Project; Technical Specification Group Core Network and Terminals; Technical realization of the Short Message Service (SMS) (Release 9); 3GPP TS 23.040 V9.2.0, Mar. 2010, pp. 1-202.

3rd Generation Partnership Project; Technical Specification Group Services and System Aspects; Support of Short Message Service (SMS) over generic 3GPP Internet Protocol (IP) access; Stage 2 (Release 10); 3GPP TS 23.204 V10.0.0, Mar. 2010; pp. 1-53.

C4-100617; 3GPP TSG CT4 Meeting #48, Vodafone; "Prevention of Timeout in IP-SM-GW", San Francisco, US, Feb. 22-26, 2010.

\* cited by examiner

DELIVERY OF SHORT MESSAGES

CROSS-REFERENCE TO RELATED APPLICATION

This application claims the priority of international patent application No. PCT/EP2010/056559, filed May 12, 2010, which designated the United States; the prior application is herewith incorporated by reference in its entirety.

BACKGROUND OF THE INVENTION

Field of the Invention

The exemplary and non-limiting embodiments of this invention relate generally to telecommunications and more specifically to delivery and processing of short messages.

Messaging is generally used in telecommunications to refer to a set of features that let a user to create, store, send, receive, and manage different types of messages, for example, text messages, multimedia messages, e-mail messages, paging messages and fax messages. Messaging covers applications which are typically based on store and forward, store and retrieve, or store and push functions, and do not necessarily require real-time transport capabilities.

Short message service SMS is a store-and-forward messaging technology that operates in near-real-time mode. The SMS is realized by the use of the Mobile Application Part (MAP) of the Signaling System 7 (SS7) protocol, with Short Message (SM) protocol elements being transported across the network as fields within the MAP messages. These MAP messages may be transported using traditional time-division multiplexing based signaling, or over Internet Protocol (IP) using signaling transport (SIGTRAN) protocol and an appropriate adaptation layer. A short message refers to a message of limited length, which may be sent between mobile stations, e-mail systems, computers, and voice frequency phones that support SMS.

The short message service is a telecommunication service for sending and receiving text messages, and it was initially defined in the standards for Global System for Mobile Communications (GSM). Today short message service is available on most digital cellular telephone networks, e.g. for Universal Mobile Telecommunications System (UMTS), and also in some paging systems. An example of short message service is specified in the 3rd Generation Partnership Project (3GPP) specifications: TS 23.040 V9.2.0 (2010-03) "Technical realization of the Short Message Service" and TS 23.204 V10.0.0 (2010-03) "Support of Short Message Service (SMS) over generic 3GPP Internet Protocol (IP) access". MAP protocol is specified in 3GPP TS 29.002 V9.1.0 (2010-03). SMS is also applicable in Long Term Evolution (LTE) networks, where LTE is used as IP access and it performs SMS over IP, or by using the Circuit Switched (CS) fallback function as specified in 3GPP TS 23.272 V9.3.0 "Circuit Switched (CS) fallback in Evolved Packet System (EPS)"

According to the specifications, the Short Message Service comprises two basic services, Short Message Mobile Terminated (SM MT) and Short Message Mobile Originated (SM MO). SM MT denotes the capability of the mobile communication system to transfer a short message submitted from the SMS Service Centre (SMS-SC) to a mobile station (MS)/user equipment (UE), and to provide information about the delivery of the short message either by a delivery report or a failure report with a specific mechanism for later delivery. SM MO denotes the capability of the communications system to transfer a short message submitted by the UE to a short message entity via SMS SC, and to provide information about the delivery of the short message either by a delivery report or a failure report.

Figure 1:
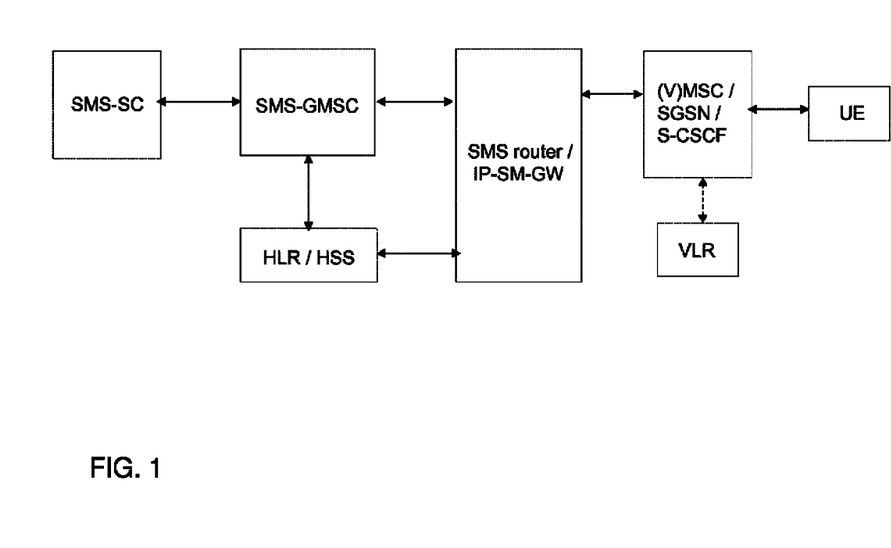
FIG. 1 is a simplified block diagram showing a system for a delivery of a SM MT short message.

A system for the delivery of SM MT is illustrated in FIG. 1. A Protocol Data Unit (PDU) containing the text message is passed to a SMS-SC for storing, and subsequent forwarding to the destination address. At a defined time, SMS-SC transmits the message to Mobile Switching Center for Short Message Service (SMS-GMSC) towards the receiving user equipment (UE). SMS-GMSC interrogates Home Location Register (HLR) or Home Subscriber Server (HSS) of the receiving subscriber for routing information, and transfers the short message to the next node using the routing information obtained from the HLR/HSS.

Delivery of a short Message from the SMS-GMSC to the UE can take different routes: (a) via circuit switched (CS) domain i.e. from SMS-GMSC to visited mobile switching centre (VMSC) to UE, (b) via packet switched (PS) domain i.e. from SMS-GMSC to serving gateway support node (SGSN) to UE, or (c) via an SMS Router. In case of VMSC, reception of the short message causes the VMSC to retrieve from Visitor Location Register (VLR) location area address of the receiving subscriber. If the retrieval is successful, VMSC transfers the short message to UE that acknowledges the reception with a delivery report. In case of SGSN, VLR does not need to be consulted.

SMS Router is an optional entity, and is essentially used only in the MT case. It has been included in the configuration due to issues of misusage (e.g. fraud issues of SMS faking and distribution of junk mail), and new regulatory requirements that public mobile networks must meet (e.g. Number Portability and Lawful Interception). SMS Router may also include IP Short Message Gateway (IP-SM-GW) functionality providing the protocol interworking for delivery of the short message between the IP-based UE and the SMS-SC. Therefore, delivery via the SMS Router (c) may include three possible routes: (c1) from SMS-GMSC to SMS Router to VMSC to UE, or (c2) from SMS-GMSC to SMS Router to SGSN to UE, or (c3)—if the SMS Router has IP-SM-GW functionality—from SMS-GMSC to SMS Router/IP-SM-GW to S-CSCF to UE, i.e. via Internet Multimedia Subsystem (IMS) domain.

Figure 2:
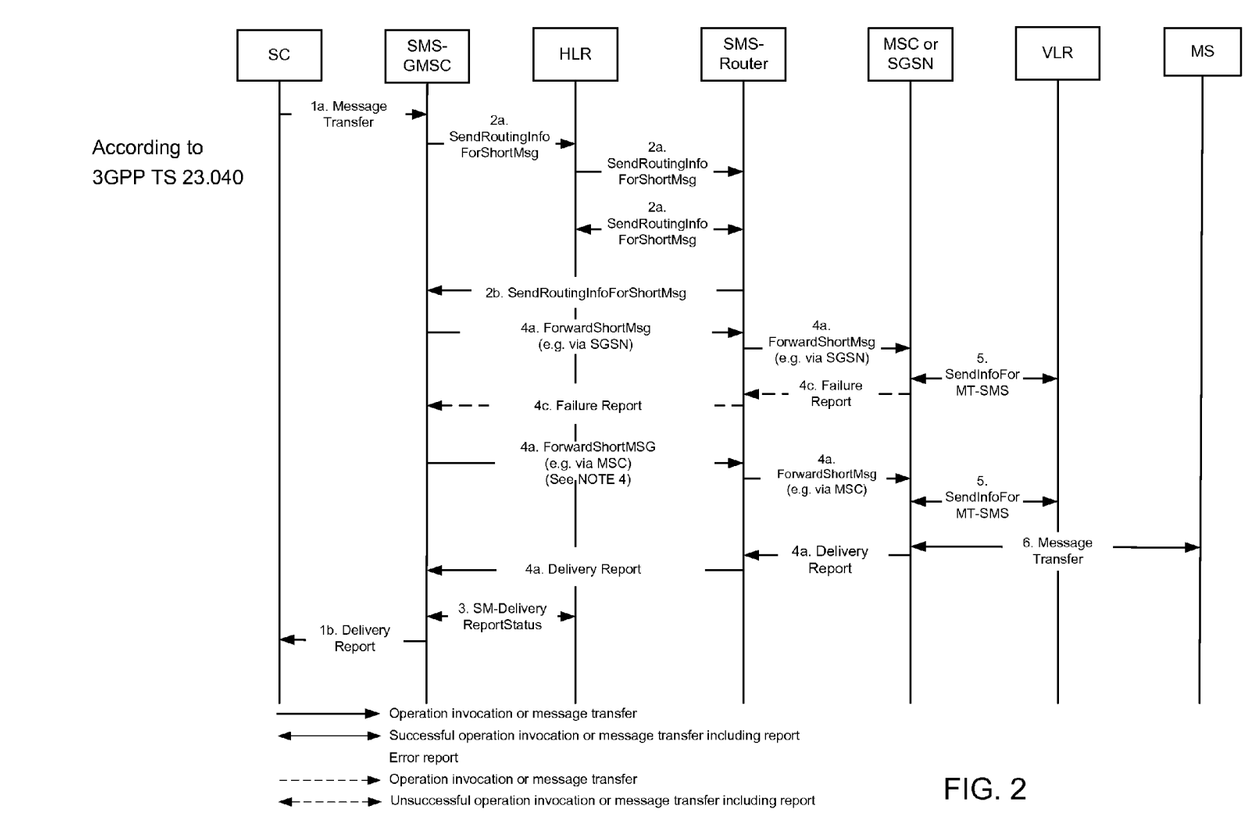
FIG. 2 is an illustration showing a SM MT short message transfer attempt failing over a first path (e.g. SGSN) and succeeding over a second path (e.g. MSC), as described in 3GPP TS 23.040.

In case (c), where the short message is sent from the SMS-GMSC to an SMS Router/IP-SM-GW, the SMS Router/IP-SM-GW performs a "domain selection" in order to decide on the further route of the short message (c1, c2, or c3). When the SMS Router/IP-SM-GW detects that the short message was successfully delivered, it returns a positive response to the SMS-GMSC. When a short message fails to reach the UE via the selected domain (e.g. via VMSC of CS domain, c1), a failure delivery report is returned to the SMS Router/IP-SM-GW. SMS Router/IP-SM-GW may retry to deliver the short message via an alternative route (e.g. via SGSN of PS domain, c2). This is illustrated in FIG. 2, taken from 3GPP TS 23.040. When this retry also fails, the SMS Router/IP-SM-GW may retry via the 3rd route (e.g. via S-CSCF of IMS access, c3). It may also decide not to perform further retries via alternative routes (e.g. because all alternatives have been tried); it then returns a negative response to the SMS-GMSC. The order in which domains are selected for message delivery is subject to operator policy and/or user preferences.

When the SMS-GMSC forwards the short message to the "next node" (e.g. SMS Router/IP-SM-GW), it starts a short message delivery timer, i.e. a supervision timer for receiving a (positive or negative) response. The value of the timer may be implementation specific. If the selected value for the timer in the SMS-GMSC is too short this may result in a situation when the short message is successfully delivered (e.g. by the first retry) but the SMS-GMSC believes that it was not, resulting in wrong charging or in double delivery. To avoid this, the SMS Router/IP-SM-GW could decide, not to do the retry (or the 2nd retry), but this may result in situations where the short message could have been delivered by the retry, possibly even in time, i.e. before the supervision timer in the SMS-GMSC expires, but it was not, thus delaying the delivery of the short message to the user. Too long timer value may result in waste of resources in the SMS-GMSC (e.g. if the supervised message is lost).

SUMMARY OF THE INVENTION

It is accordingly an object of the invention to provide an improved delivery of short messages which overcome the above-mentioned disadvantages of the prior art methods and devices of this general type.

According to a first aspect of the present invention, there is provided a method containing receiving a message to be delivered to user equipment, negotiating a timer value with a short message service routing element, forwarding the message to the short message service routing element, and starting a timer according to the negotiated timer value.

In the method, the negotiated timer value may be forwarded to the short message service routing element together with the message.

In some embodiments, the negotiating may further contain sending a request for a timer value proposal to the short message service routing element, receiving a response including a timer value proposal from short message service routing element, and deciding a timer value based on the timer value proposal.

In the method, the deciding may contain deciding a timer value according to the timer value proposal, or a timer value smaller than the timer value proposal.

In the method, the short message service routing element may contain a short message service router or an internet protocol short message gateway. The receiving may contain receiving a response at a short message service gateway mobile switching center.

In some embodiments, the request for a timer value proposal may further include an indication for support of a timer value re-negotiation mechanism.

In some embodiments, the method may further contain receiving a request for timer value re-negotiation from the short message service routing element, and sending a response acknowledging timer value re-negotiation to the short message service routing element. The timer value re-negotiation may contain restarting the timer.

In some embodiments, the method may further contain deciding a second timer value, and restarting the timer with the second decided timer value, and the response acknowledging timer value re-negotiation may further contain the decided second timer value.

According to a second aspect of the present invention, there is provided a method comprising receiving a request for a timer value proposal from a short message service gateway element, deriving a timer value proposal, and sending a response including the timer value proposal to the short message service gateway element.

In some embodiments, the deriving may be based on the number and sort of available delivery routes.

In some embodiments, the request for a timer value proposal may further include an indication for support of a timer value re-negotiation mechanism, and the method may further comprise sending a request for a timer value re-negotiation to the short message service gateway element, and receiving a response acknowledging timer value re-negotiation from the short message service gateway element. The timer value re-negotiation may comprise restarting the timer.

In some embodiments, the request for a timer value re-negotiation may further contain a second proposed timer value.

In some embodiments, at least one of the requests and responses may contain a mobile application part protocol message.

In some embodiments, the timer is a short message delivery timer.

According to a fourth aspect of the present invention, there is provided a short message service gateway element containing a receiver configured to receive a message to be delivered to a user equipment, a processor configured to negotiate a timer value with a short message service routing element and to start a timer according to the negotiated timer value, and a transmitter configured to forward the message to the short message service routing element.

In some embodiments, the transmitter may be further configured to send a request for a timer value proposal to the short message service routing element, the receiver may be further configured to receive a response including a timer value proposal from short message service routing element, and the processor may be further configured to decide a timer value based on the received timer value proposal.

In some embodiments, the negotiated timer value may be forwarded to the short message service routing element together with the message.

In some embodiments, the processor may be further configured to decide a timer value according to the timer value proposal, or it may or a timer value smaller than the timer value proposal.

In some embodiments, the short message service routing element may contain a short message service router or an internet protocol short message gateway.

In some embodiments the short message service gateway element may contain a short message service gateway mobile switching centre.

In some embodiments, the request for a timer value proposal may further include an indication for support of a timer value re-negotiation mechanism.

In some embodiments, the receiver may be further configured to receive a request for a timer value re-negotiation from the short message service routing element, and the transmitter may be further configured to send a response acknowledging timer value re-negotiation to the short message service routing element.

In some embodiments, the timer value re-negotiation may contain restarting the timer.

In some embodiments, the processor may be further configured to decide a second timer value and to restart the timer with the second decided timer value, and the response acknowledging timer value re-negotiation may further comprise the decided second timer value.

In some embodiments, the timer may be a short message delivery timer.

According to a fifth aspect of the present invention, there is provided a short message service routing element containing a receiver configured to receive a request for a timer value proposal from a short message service gateway element, a processor configured to derive a timer value proposal, and a transmitter configured to send a response including the timer value proposal to the short message service gateway element.

In some embodiments, the processor may be further configured to derive the timer value based on the number and sort of available delivery routes.

In some embodiments, the transmitter may be further configured to send a request for a timer value re-negotiation to the short message service gateway element, and the receiver may be further configured to receive a response acknowledging timer value re-negotiation from the short message service gateway element.

In some embodiments, the timer value re-negotiation may include restarting the timer.

In some embodiments, the request for a timer value re-negotiation may further include a second proposed timer value.

In some embodiments, the response acknowledging timer value re-negotiation may further include a second decided timer value.

In some embodiments, the timer may be a short message delivery timer.

According to a sixth aspect of the present invention, there is provided a system containing the short message service gateway element and the short message service routing element.

According to a seventh aspect of the present invention, there is provided a computer program product containing an executable code configured to perform a method according to any embodiment of the invention when executed in a computing device.

Although the various aspects, embodiments and features of the invention are recited independently, it should be appreciated that all combinations of them are possible and within the scope of the present invention as claimed.

Embodiment of the present invention may have one or more of following of the now described advantages.

More efficient use of resources in the SMS-GMSC and SMS Router/IP-SM-GW. Shorter delivery time of a short message from an SMS SC to a UE. More reliable delivery of a short message from an SMS SC to a UE. Avoidance of double delivery of a short message from an SMS SC to a UE. More accurate charging and better user experience.

Other features which are considered as characteristic for the invention are set forth in the appended claims.

Although the invention is illustrated and described herein as embodied in an improved delivery of short messages, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any node for any communication system or any combination of different communication systems that support a messaging service. The communication system may be a fixed communication system or a wireless communication system or a communication system utilizing both fixed networks and wireless networks. The messaging service may apply to different types of messages, for example, text messages, multimedia messages, e-mail messages, paging messages and fax messages. The protocols and specifications of communication systems, servers and user terminals, especially in wireless communication, develop rapidly. Such development may require additional changes to an embodiment. Therefore, all words and expressions should be interpreted broadly and they are intended to illustrate, not to restrict, the embodiment.

Figure 3:
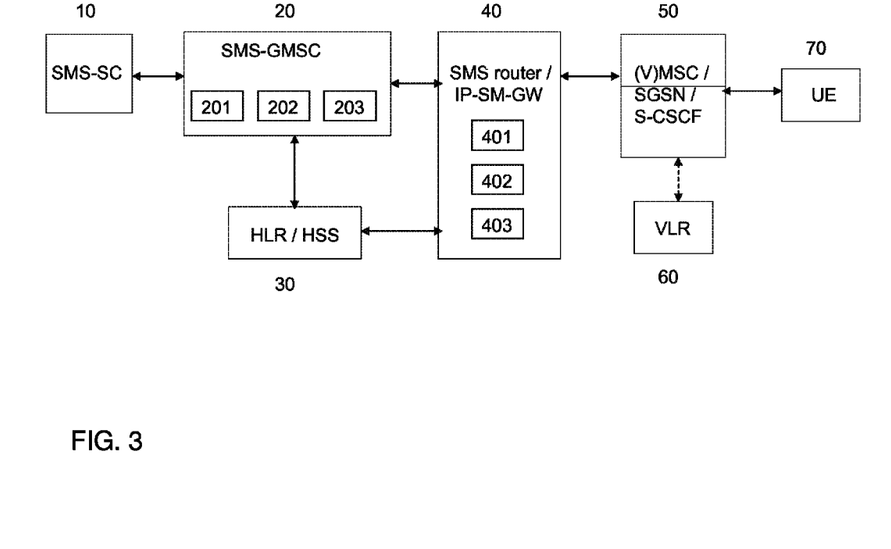
FIG. 3 is a simplified block diagram showing an embodiment of the invention.

FIG. 3 shows a simplified block diagram illustrating elements used for the SM MT short message transfer from an SMS-SC 10 to a UE 70 in an exemplary system architecture. SMS-SC 10 is a function responsible for the relaying and store-and-forwarding of a short message. The SMS-SC is not a part of the GSM/UMTS Public Land Mobile Network (PLMN); however MSC and SC may be integrated.

SMS-GMSC 20 is a function of an MSC capable of receiving a short message from an SMS-SC, interrogating an HLR/HSS for routing information and SMS info, and delivering the short message to the next node on the route to the recipient UE. HLR/HSS 30 is a central database that contains details of each mobile phone subscriber that is authorized to use the GSM/UMTS/IMS core network.

SMS Router/IP-MS-GW 40 is an element performing a domain selection in order to decide on the further route of the short message, delivering the short message to VMSC/SGSN/S-CSCF 50 and returning a (positive/negative) delivery response to the SMS-GMSC 20. IP-SM-GW capability in SMS Router is a function responsible for protocol interworking between the IP-based UE and the SMS-SC 10. VMSC/SGSN/S-CSCF 50 is a control function which performs signaling functions for mobile stations currently served by the MSC/SGSN/S-CSCF. VLR 60 is a database in GSM system storing information about all the mobiles that are currently under the jurisdiction of the MSC which it serves and it is interrogated by VMSC 50.

A mobile station, user equipment UE 70, represents here a mobile device. Together with the software, applications, and content that are directly related to it, the device functions within and is supported by mobile infrastructure of the applied communications network. For short message service support the UE 70 is configured to communicate via the communications system with a short message service centre SMS-SC 10 and exchange short message transfer protocol data units (SMS PDUs) with it.

In a method according to an embodiment of the invention, the SMS-SC 10 may receive a short message to be transferred to UE 70 and forward the short message to SMS-GMSC 20. As shown in steps S1-S4 of an embodiment illustrated in FIG. 4, SMS-GMSC 20 may receive S1 the short message to be delivered to UE 70, negotiate S2 a timer value with SMS Router/IP-SM-GW 40, forward S3 the short message to the Router/IP-SM-GW 40 and start S4 a timer according to the negotiated timer value.

Figure 4:
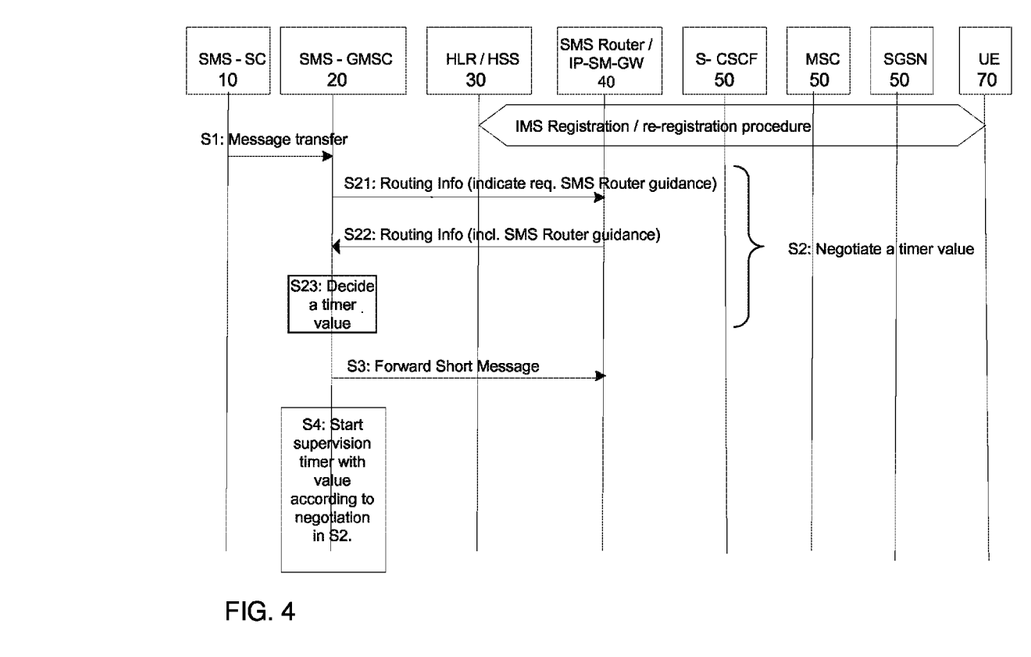
FIG. 4 is an illustration showing a method according to an embodiment of the invention.

The negotiating S2 may contain SMS-GMSC 20 sending S21 to SMS Router/IP-SM-GW 40 a message "MAP_SEND_ROUTING_INFO_FOR_SM" request including an indication that SMS Router guidance for timer value is expected. The indication may take a form of a parameter in the message. The parameter may be e.g. "sm-RouterGuidanceIndicator" indicating whether or not the SMS-GMSC 20 is prepared to receive SMS-Router guidance in the response and it may take value "timerNegotiationSupported". Examples of corresponding short message data types for MAP protocol are illustrated below, the new parts in italic font.

```
    RoutingInfoForSM-Arg ::= SEQUENCE {
msisdn                    [0] ISDN-AddressString,
sm-RP-PRI                 [1] BOOLEAN,
serviceCentreAddress      [2] AddressString,
extensionContainer        [6] ExtensionContainer
                              OPTIONAL, ... ,
gprsSupportIndicator      [7] NULL OPTIONAL,
gprsSupportIndicator is set only if the SMS-GMSC supports
receiving of two numbers from the HLR
sm-RP-MTI                 [8] SM-RP-MTI      OPTIONAL,
sm-RP-SMEA                [9] SM-RP-SMEA     OPTIONAL,
sm-deliveryNotIntended    [10] SM-DeliveryNotIntended
                              OPTIONAL,
sms-RouterGuidanceIndicator  [11] SMS-RouterGuidanceIndicator
                              OPTIONAL }
    SMS-RouterGuidanceIndicator ::= BIT STRING {
timerNegotiation supported (0),
restartTimerMessageSupported (1)} (SIZE (2..8))
exception handling:
bits 2 to 7 shall be ignored if received and not understood
```

SMS Router/IP-SM-GW 40 may derive a timer value proposal, e.g. based on the number and sort of available delivery routes or on support/non-support of the timer value re-negotiation mechanism, and send it as SMS Router guidance to SMS-GMSC 20. In step S22, SMS-GMSC 20 may receive a message "MAP_SEND_ROUTING_INFO_FOR_SM" response including SMS Router guidance for timer value from SMS Router/IP-SM-GW 40. The guidance may take a form of a parameter in the message and be an integer value proposing a timer value. The parameter may be e.g. "sm-RouterGuidance" and it may be defined as "SM-DeliveryTimeValue" value. Examples of corresponding short message data types for MAP protocol are illustrated below, the new parts in italic font.

```
    RoutingInfoForSM-Res ::= SEQUENCE {
imsi            IMSI,
locationInfoWithLMSI  [0] LocationInfoWithLMSI,
extensionContainer    [4] ExtensionContainer  OPTIONAL,
...,
sms-RouterGuidance    [5] SM-DeliveryTimeValueOPTIONAL
SM-DeliveryTimeValue contains the value proposed by the SMS-Router}
    SM-DeliveryTimerValue ::= INTEGER (30..600)
```

In step S23, SMS-GMSC 20 may decide a timer value based on the SMS Router guidance. SMS-GMSC 20 may decide a timer value corresponding to the proposed SMS Router guidance integer value in "MAP_SEND_ROUTING_INFO_FOR_SM" response or it may decide a value smaller than the proposed integer value. In step S4, SMS-GMSC 20 may send a message "MAP_MT_FORWARD_SHORT_MESSAGE" to SMS Router/IP-SM-GW 40 including the short message to be forwarded and the decided timer value. The decided timer value may take a form of a parameter in the message and be an integer value. The parameter may be e.g. "sm-DeliveryTimer" and it may be defined as "SM-DeliveryTimeValue" value. Examples of corresponding short message data types for MAP protocol are illustrated below, the new parts in italic font.

```
    MT-ForwardSM-Arg ::= SEQUENCE {
sm-RP-DA                   SM-RP-DA,
sm-RP-OA                   SM-RP-OA,
sm-RP-UI                   SignalInfo,
moreMessagesToSend         NULL                OPTIONAL,
extensionContainer ExtensionContainer          OPTIONAL,
... ,
smDeliveryTimer            SM-DeliveryTimerValue  OPTIONAL,
smDeliveryTimestamp        Time  OPTIONAL }
SM-DeliveryTimeValue contains the value used by the SMS-GMSC
    SM-DeliveryTimerValue ::= INTEGER (30..600)
```

In a further method according to the invention, the message "MAP_SEND_ROUTING_INFO_FOR_SM" request of step S21 may further include an indication that a timer value re-negotiation mechanism is supported. The indication may take a form of a parameter in the message. The parameter may be e.g. "sm-RouterGuidanceIndicator" indicating whether or not the SMS-GMSC 20 is prepared to re-negotiate the timer value and it may take value "restartTimerMessageSupported". In the embodiment, SMS Router/IP-MS-GW 40 may derive a timer value proposal based also on the support/non-support of the re-negotiation mechanism as indicated by the SMS-GMSC 20.

The message "MAP_SEND_ROUTING_INFO_FOR_SM" request of step S21 may, in some embodiments, only include an indication that a timer value re-negotiation mechanism is supported and no request that SMS Router guidance for timer value is expected. Thus, timer value re-negotiation mechanism may also be used independently even though no timer value negotiation in step S2 has been done. The indication may take a form of a parameter in the message.

When SMS-GMSC 20 sends to SMS Router/IP-SM-GW 40 the message "MAP_MT_FORWARD_SHORT_MESSAGE" including the short message to be forwarded, it may also start S4 the timer. SMS Router/IP-SM-GW 40 may receive the message, perform a domain selection S5 in order to decide on the further route of the short message and forward S6 the message to MSC, SGSN or S-SFSC 50 depending on the selected route.

Figure 5:
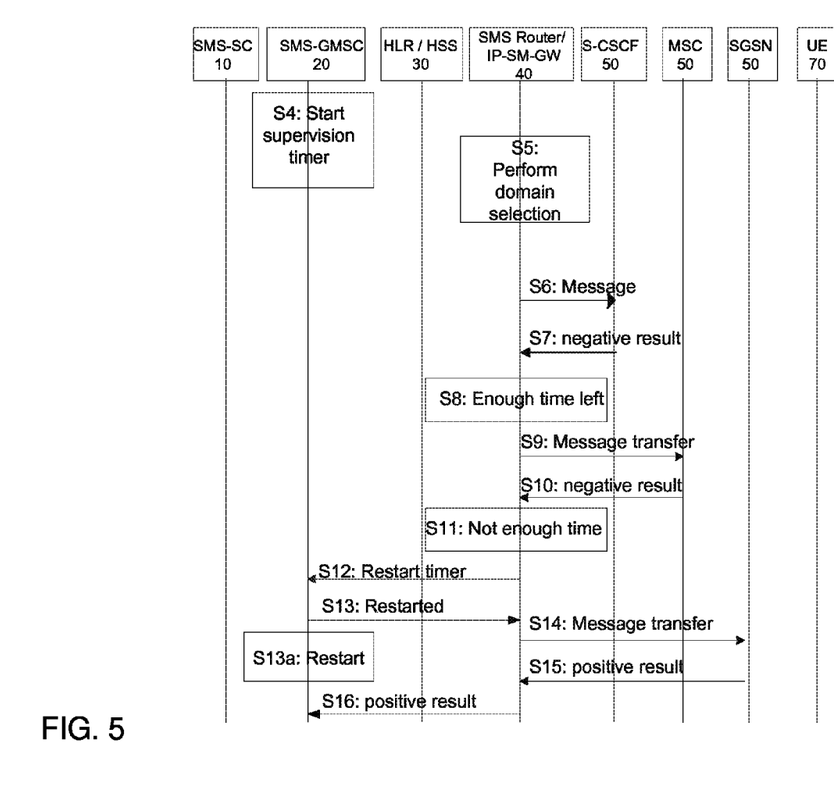
FIG. 5 is an illustration showing a method according to a further embodiment of the invention.

If the delivery of the short message is successful, SMS Router/IP-SM-GW 40 may return a positive response to the SMS-GMSC 20. If the delivery of the short message fails S7 on the selected route, and if SMS Router/IP-SM-GW 40 may conclude that there is enough time left S8 in the timer for a retry, SMS Router/IP-SM-GW 40 may decide to retry to deliver S9 the short message via an alternative route. However, if SMS Router/IP-SM-GW 40 concludes that there is not enough time left S11 in the timer for a retry, and if "MAP_SEND_ROUTING_INFO_FOR_SM" request of step S21 included an indication that a timer value re-negotiation mechanism is supported, the SMS Router/IP-SM-GW 40 may request S12 SMS-GMSC 20 to re-negotiate the timer value. The re-negotiation may e.g. comprise restarting the timer. The request may be sent as a new MAP message from SMS Router/IP-SM-GW 40 to SMS-GMSC 20. The message may be e.g.

"MAP_MT_Forward_SM_INTERMEDIATE_RESULT" or "MAP_RESTART_TIMER". The new MAP message may further contain a proposed timer value with which the supervision timer should be restarted.

SMS Router/IP-SM-GW 40 may also derive and propose a new timer value in the message requesting timer value re-negotiation. SMS-GMSC 20 may receive the MAP message including the request and in one embodiment also the new timer value proposal. SMS-GMSC 20 may decide to restart 513a the timer and sends S13 a response indicating restarting the timer. SMS-GMSC 20 may also decide a new timer value and the response may include the new decided timer value. The deciding may be based on the new proposed timer value received from SMS Router/IP-SM-GW 40.

FIG. 3 shows a system and an apparatus according to an embodiment of the invention. A short message service gateway element 20, preferably an SMS-GMSC, may contain a receiver 201, processor 202 and a transmitter 203. The receiver 201 may receive a short message to be delivered to a UE 70 from SMS-SC 10. The processor 202 may negotiate a timer value with SMS Router/IP-SM-GW 40 and start a timer according to the negotiated timer value. The transmitter 203 may forward the message to be delivered to the UE 70 to the SMS Router/IP-SM-GW 40.

The negotiation may include the transmitter 203 sending a message "MAP_SEND_ROUTING_INFO_FOR_SM" request to SMS Router/IP-SM-GW 40 requesting a timer value proposal. The receiver 201 may receive a message "MAP_SEND_ROUTING_INFO_FOR_SM" response from SMS Router/IP-SM-GW 40 including a timer value proposal and the processor 202 may decide a timer value based on the received timer value proposal. The processor 202 may decide a timer value according to the received timer value proposal or a timer value smaller than the received timer value proposal. The transmitter 203 may forward the decided timer value to SMS Router/IP-SM-GW 40 together with the short message in a "MAP_MT_FORWARD_SHORT_MESSAGE".

In a further embodiment, the message "MAP_SEND_ROUTING_INFO_FOR_SM" request to SMS Router/IP-SM-GW 40 requesting a timer value proposal may also include an indication for support of a timer value re-negotiation mechanism, e.g. restarting the timer. The receiver 201 may receive a message requesting restarting the timer from SMS Router/IP-SM-GW 40. The message may also include a second proposed timer value. The processor 202 may decide to restart the timer and it may decide a new timer value to be used. The transmitter 203 may send a message acknowledging timer value re-negotiation to SMS Router/IP-SM-GW 40. The message may include the new decided timer value.

The message "MAP_SEND_ROUTING_INFO_FOR_SM" request may, in some embodiments, only include an indication that a timer value re-negotiation mechanism is supported and no request that SMS Router guidance for timer value is expected. Thus, timer value re-negotiation mechanism may also be used independently even though no timer value negotiation between the processor 202 and SMS Router/IP-SM-GW 40 has been done. The indication may take a form of a parameter in the message FIG. 3 shows a system and an apparatus also according to another embodiment of the invention. A short message service routing element 40, preferably an SMS Router/IP-SM-GW, may contain a receiver 401, a processor 402 and a transmitter 403. The receiver 401 may receive a message requesting a timer value proposal from a SMS-GMSC 20. The message may be "MAP_SEND_ROUTING_INFO_FOR_SM" request. The processor 402 may derive a timer value proposal, for example based on the number and sort of available delivery routes or on support/non-support of the timer value re-negotiation mechanism. The transmitter 403 may send a message including the timer value proposal to SMS-GMSC 20. The message may be "MAP_SEND_ROUTING_INFO_FOR_SM" response. The receiver 401 may receive a decided timer value from SMS-GMSC 20 together with a short message to be forwarded to a UE 70 in a "MAP_MT_FORWARD_SHORT_MESSAGE".

Te message "MAP_SEND_ROUTING_INFO_FOR_SM" request from SMS-GMSC 20 requesting a timer value proposal may also include an indication for support of a timer value re-negotiation mechanism. When the receiver 401 receives the message "MAP_MT_FORWARD_SHORT_MESSAGE", the processor 402 may perform a domain selection in order to decide on the further route of the short message and the transmitter 403 may forward the message to MSC, SGSN or S-SFSC 50 depending on the selected route.

The message "MAP_SEND_ROUTING_INFO_FOR_SM" request from SMS-GMSC 20 may, in some embodiments, only include an indication that a timer value re-negotiation mechanism is supported and no request that SMS Router guidance for timer value is expected. Thus, timer value re-negotiation mechanism may also be used independently even though no timer value proposal has been derived by the processor 402 in the earlier phase. The indication may take a form of a parameter in the message.

If the delivery of the short message is successful, the transmitter 403 may send a positive response to the SMS-GMSC 20. If the delivery of the short message fails on the selected route, the processor 402 may conclude whether there is enough time left in the timer for a retry. If it concludes that there is enough time, the processor 402 may decide to retry to deliver the short message via an alternative route. However, if it concludes that there is not enough time left, and if "MAP_SEND_ROUTING_INFO_FOR_SM" request included an indication that a timer value re-negotiation mechanism is supported, the transmitter 403 may send a request to SMS-GMSC 20 to re-negotiate the timer value. The re-negotiation may comprise e.g. restarting the timer.

The processor 402 may derive a new timer value proposal based on the number and sort of available delivery routes and on support/non-support of the timer value re-negotiation mechanism as indicated by the SMS-GMSC 20. The transmitter 403 may send a message requesting restarting the timer to SMS-GMSC 20. The message may also include a second proposed timer value. The receiver 401 may receive a message acknowledging timer value re-negotiation from SMS-GMSC 20. The message may include the new decided timer value.

In general, the various embodiments may be implemented in hardware or special purpose circuits, software, logic or any combination thereof. Some aspects may be implemented in hardware, while some other aspects may be implemented in firmware or software, which may be executed by a controller, microprocessor or other computing device. Software routines, which are also called as program products, are articles of manufacture and can be stored in any apparatus-readable data storage medium and they include program instructions to perform particular tasks. The exemplary embodiments of this invention also provide a computer program product, readable by a computer and encoding a computer program of instructions for executing a computer process for controlling functions in an apparatus of FIG. 3.

While various aspects of the invention may be illustrated and described as block diagrams, message flow diagrams, flow charts and logic flow diagrams, or using some other pictorial representation, it is well understood that the illustrated units, blocks, apparatus, system elements, procedures and methods may be implemented in, for example, hardware, software, firmware, special purpose circuits or logic, a computing device or some combination thereof. It will be obvious to a person skilled in the art that, as the technology advances, the inventive concept can be implemented in various ways. The invention and its embodiments are not limited to the examples described above but may vary within the scope of the claims.

The invention claimed is:

1. A method, which comprises the steps of:
   receiving a message to be delivered to user equipment;
   negotiating a timer value with a short message service routing element;
   forwarding the message to the short message service routing element; and
   starting a timer according to the timer value negotiated.

2. The method according to claim 1, which further comprises forwarding the timer value negotiated to the short message service routing element together with the message.

3. The method according to claim 1, wherein the negotiating step further comprises:
   sending a request for a timer value proposal to the short message service routing element;
   receiving a response including the timer value proposal from the short message service routing element; and
   deciding the timer value based on the timer value proposal.

4. The method according to claim 3, wherein the deciding step further comprises forming the timer value according to the timer value proposal.

5. The method according to claim 3, wherein the deciding step further comprises forming the timer value to be smaller than the timer value proposal.

6. The method according to claim 3, wherein the request for the timer value proposal further includes an indication for support of a timer value re-negotiation mechanism.

7. The method according to claim 3, further comprising:
   receiving a request for timer value re-negotiation from the short message service routing element; and
   sending a response acknowledging the timer value re-negotiation to the short message service routing element.

8. The method according to claim 7, wherein the timer value re-negotiation includes restarting the timer.

9. The method according to claim 7, which further comprises:
   deciding a second timer value; and
   restarting the timer with the second timer value;
   including in the response acknowledging the timer value re-negotiation, the second timer value.

10. A method, which comprises the steps of:
    receiving a request for a timer value proposal from a short message service gateway element;
    deriving a timer value proposal; and
    sending a response including the timer value proposal to the short message service gateway element.

11. The method according to claim 10, wherein the deriving step is based on a number and sort of available delivery routes.

12. The method according to claim 10, wherein the request for the timer value proposal further includes an indication for support of a timer value re-negotiation mechanism, the method further comprises:
    sending a request for a timer value re-negotiation to the short message service gateway element; and
    receiving a response acknowledging the timer value re-negotiation from the short message service gateway element.

13. The method according to claim 12, wherein the timer value re-negotiation includes restarting a timer.

14. The method according to claim 12, wherein the request for the timer value re-negotiation further comprises a second proposed timer value.

15. A short message service gateway element, comprising:
    a receiver configured to receive a message to be delivered to user equipment;
    a processor configured to negotiate a timer value with a short message service routing element and to start a timer according to the timer value negotiated; and
    a transmitter for forwarding the message to the short message service routing element.

16. The short message service gateway element according to claim 15, wherein:
    said transmitter configured to send a request for a timer value proposal to the short message service routing element;
    said receiver configured to receive a response including the timer value proposal from the short message service routing element; and
    said processor configured to decide the timer value based on the timer value proposal received.

17. The short message service gateway element according to claim 15, wherein the timer value negotiated is forwarded to the short message service routing element together with the message.

18. The short message service gateway element according to claim 16, wherein said processor configured to determine the timer value according to the timer value proposal.

19. The short message service gateway element according to claim 16, wherein said processor configured to form the timer value to be smaller than the timer value proposal.

20. The short message service gateway element according to claim 16, wherein the request for the timer value proposal further includes an indication for support of a timer value re-negotiation mechanism.

21. The short message service gateway element according to claim 15, wherein:
    said receiver configured to receive a request for a timer value re-negotiation from the short message service routing element; and
    said transmitter configured to send a response acknowledging the timer value re-negotiation to the short message service routing element.

22. The short message service gateway element according to claim 21, wherein the timer value re-negotiation includes restarting the timer.

23. The short message service gateway element according to claim 21, wherein:
    said processor configured to form a second timer value and to restart the timer with the second timer value; and
    said response acknowledging the timer value re-negotiation further comprises the second timer value.

24. A short message service routing element, comprising:
    a receiver configured to receive a request for a timer value proposal from a short message service gateway element;
    a processor configured to derive a timer value proposal; and a transmitter configured to send a response including the timer value proposal to the short message service gateway element.

25. The short message service routing element according to claim 24, wherein said processor configured to derive the timer value based on a number and sort of available delivery routes.

26. The short message service routing element according to claim 24, wherein:
said transmitter configured to send a request for a timer value re-negotiation to the short message service gateway element; and
said receiver configured to receive a response acknowledging timer value re-negotiation from the short message service gateway element.

27. The short message service routing element according to claim 26, wherein the timer value re-negotiation includes restarting a timer.

28. The short message service routing element according to claim 26, wherein the request for the timer value re-negotiation further includes a second proposed timer value.

29. The short message service routing element according to claim 28, wherein the response acknowledging the timer value re-negotiation further includes the second proposed timer value.

30. A non-transitory computer-readable medium having computer-executable instructions configured to control a processor to perform a method which comprises the steps of:
receiving a message to be delivered to user equipment;
negotiating a timer value with a short message service routing element;
forwarding the message to the short message service routing element; and
starting a timer according to the timer value negotiated.

31. A non-transitory computer-readable medium having computer-executable instructions configured to control a processor to perform a method which comprises the steps of:
receiving a request for a timer value proposal from a short message service gateway element;
deriving a timer value proposal; and
sending a response including the timer value proposal to a short message service gateway element.

* * * * *